(12) United States Patent
Yamazaki et al.

(10) Patent No.: US 10,724,980 B2
(45) Date of Patent: Jul. 28, 2020

(54) HUMIDITY DETECTOR

(71) Applicant: DENSO CORPORATION, Kariya, Aichi-pref. (JP)

(72) Inventors: Ryuta Yamazaki, Kariya (JP); Syo Okabe, Kariya (JP); Tatsumi Kumada, Kariya (JP); Kazuaki Takemoto, Kariya (JP); Kyoichiro Yamamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 263 days.

(21) Appl. No.: 15/743,770

(22) PCT Filed: Jul. 20, 2016

(86) PCT No.: PCT/JP2016/071285
§ 371 (c)(1),
(2) Date: Jan. 11, 2018

(87) PCT Pub. No.: WO2017/029928
PCT Pub. Date: Feb. 23, 2017

(65) Prior Publication Data
US 2018/0209929 A1   Jul. 26, 2018

(30) Foreign Application Priority Data

Aug. 17, 2015   (JP) ................................ 2015-160641

(51) Int. Cl.
*G01N 27/22* (2006.01)
*B60H 1/00* (2006.01)
(Continued)

(52) U.S. Cl.
CPC ....... *G01N 27/223* (2013.01); *B60H 1/00785* (2013.01); *B60H 1/00849* (2013.01);
(Continued)

(58) Field of Classification Search
CPC .............. G01D 18/008; B60H 1/00785; B60H 2001/00114; G01K 7/22; G01N 27/223
See application file for complete search history.

(56) References Cited

U.S. PATENT DOCUMENTS 7,565,255 B2 *  7/2009  Kanke ................... G01F 1/6845
                                                        702/100
9,434,235 B2 *  9/2016  Eisenhour .......... B60H 1/00742
(Continued)

FOREIGN PATENT DOCUMENTS

JP     S48094128 A     12/1973
JP     S58135945 A      8/1983
(Continued)

*Primary Examiner* — Mohamed Charioui
(74) *Attorney, Agent, or Firm* — Harness, Dickey & Pierce, P.L.C.

(57) ABSTRACT

A humidity detector a humidity sensor detecting a relative humidity of an air inside a sensor case housing the humidity sensor. The humidity detector has an air volume obtaining section, a flow direction obtaining section, a setting section, and a correction section. The air volume obtaining section obtains air volume information correlated with an air volume of the air flowing around the humidity sensor. The flow direction obtaining section obtains flow direction information correlated with a flow direction of the air flowing around the humidity sensor. The setting section sets correction factors configuring a dynamic compensator based on the air volume information and the flow direction information. The dynamic compensator compensates for a response delay of the humidity sensor. The correction section corrects a detection value, which is detected by the humidity sensor, by using the dynamic compensator to obtain the relative humidity of the air.

5 Claims, 11 Drawing Sheets

(51) Int. Cl.
  *B60H 1/04* (2006.01)
  *B60S 1/54* (2006.01)
  *G01K 7/22* (2006.01)

(52) U.S. Cl.
  CPC ............... *B60H 1/04* (2013.01); *B60S 1/54* (2013.01); *G01K 7/22* (2013.01); *B60H 1/00864* (2013.01); *B60H 2001/00114* (2013.01); *B60H 2001/00185* (2013.01)

(56) References Cited

U.S. PATENT DOCUMENTS

| | | | |
|---|---|---|---|
| 10,324,424 B2* | 6/2019 | Perez | G05B 13/047 |
| 2011/0307208 A1 | 12/2011 | Graf et al. | |
| 2016/0327418 A1* | 11/2016 | Graf | G01D 18/008 |

FOREIGN PATENT DOCUMENTS

| | | |
|---|---|---|
| JP | S60174310 A | 9/1985 |
| JP | S64034315 U | 3/1989 |
| JP | H07257168 A | 10/1995 |
| JP | 2526872 B2 | 8/1996 |
| JP | 2015143702 A | 8/2015 |
| JP | 2016075656 A | 5/2016 |

* cited by examiner

| MODE | BLE_LEV | K1 | T1 |
|---|---|---|---|
| FACE | Lo | K1−1 | T1−1 |
| | Mid | K1−2 | T1−2 |
| | Hi | K1−3 | T1−3 |
| FOOT | Lo | K1−4 | T1−4 |
| | Mid | K1−5 | T1−5 |
| | Hi | K1−6 | T1−6 |
| F/D | Lo | K1−7 | T1−7 |
| | Mid | K1−8 | T1−8 |
| | Hi | K1−9 | T1−9 |
| DEF | Lo | K1−10 | T1−10 |
| | Mid | K1−11 | T1−11 |
| | Hi | K1−12 | T1−12 |

FIG. 11

| MODE | BLE_LEV | K1 | K2 | T1 | T3 |
|------|---------|------|------|------|------|
| FACE | Lo | K1−1 | K2−1 | T1−1 | T3−1 |
|      | Mid | K1−2 | K2−2 | T1−2 | T3−2 |
|      | Hi | K1−3 | K2−3 | T1−3 | T3−3 |
| FOOT | Lo | K1−4 | K2−4 | T1−4 | T3−4 |
|      | Mid | K1−5 | K2−5 | T1−5 | T3−5 |
|      | Hi | K1−6 | K2−6 | T1−6 | T3−6 |
| F/D | Lo | K1−7 | K2−7 | T1−7 | T3−7 |
|     | Mid | K1−8 | K2−8 | T1−8 | T3−8 |
|     | Hi | K1−9 | K2−9 | T1−9 | T3−9 |
| DEF | Lo | K1−10 | K2−10 | T1−10 | T3−10 |
|     | Mid | K1−11 | K2−11 | T1−11 | T3−11 |
|     | Hi | K1−12 | K2−12 | T1−12 | T3−12 |

FIG. 13

| MODE | BLE_LEV | K1 | K2 | ... | KN | T1 | T3 | ... | TN |
|------|---------|-----|-----|-----|-----|-----|-----|-----|-----|
| FACE | Lo | K1-1 | K2-1 | ... | KN-1 | T1-1 | T3-1 | ... | TN-1 |
| FACE | Mid | K1-2 | K2-2 | ... | KN-2 | T1-2 | T3-2 | ... | TN-2 |
| FACE | Hi | K1-3 | K2-3 | ... | KN-3 | T1-3 | T3-3 | ... | TN-3 |
| FOOT | Lo | K1-4 | K2-4 | ... | KN-4 | T1-4 | T3-4 | ... | TN-4 |
| FOOT | Mid | K1-5 | K2-5 | ... | KN-5 | T1-5 | T3-5 | ... | TN-5 |
| FOOT | Hi | K1-6 | K2-6 | ... | KN-6 | T1-6 | T3-6 | ... | TN-6 |
| F/D | Lo | K1-7 | K2-7 | ... | KN-7 | T1-7 | T3-7 | ... | TN-7 |
| F/D | Mid | K1-8 | K2-8 | ... | KN-8 | T1-8 | T3-8 | ... | TN-8 |
| F/D | Hi | K1-9 | K2-9 | ... | KN-9 | T1-9 | T3-9 | ... | TN-9 |
| DEF | Lo | K1-10 | K2-10 | ... | KN-10 | T1-10 | T3-10 | ... | TN-10 |
| DEF | Mid | K1-11 | K2-11 | ... | KN-11 | T1-11 | T3-11 | ... | TN-11 |
| DEF | Hi | K1-12 | K2-12 | ... | KN-12 | T1-12 | T3-12 | ... | TN-12 |

HUMIDITY DETECTOR

CROSS REFERENCE TO RELATED APPLICATIONS

This application is a U.S. National Phase Application under 35 U.S.C. 371 of International Application No. PCT/JP2016/071285 filed on Jul. 20, 2016 and published in Japanese as WO 2017/029928 A1 on Feb. 23, 2017. This application is based on and claims the benefit of priority from Japanese Patent Application No. 2015-160641 filed on Aug. 17, 2015. The entire disclosures of all of the above applications are incorporated herein by reference.

TECHNICAL FIELD

The present disclosure relates to a humidity detector.

BACKGROUND ART

A defogging device defogging a windshield of a vehicle is known to have a humidity sensor that detects humidity near a surface of the windshield. The defogging device performs a defogging control, in which a conditioned air is blown toward the surface from a defroster outlet to defog the windshield, depending on a detection value of the humidity sensor. Such a technique is described in Patent Literature 1, for example.

The defogging device has a temperature sensor, a memory, and a control unit. The temperature sensor detects a temperature around the humidity sensor. The memory stores, as a function, relationship between the temperature around the humidity sensor and a response delay time of the humidity sensor in advance. The control unit calculates the response delay time of the humidity sensor based on a detection value of the temperature sensor.

The control unit compensates for the response delay of the humidity sensor based on a calculated response delay time and a change rate of an output from the humidity sensor, and then performs the defogging control depending on the detection value of the humidity sensor being compensated for the response delay.

Thus, the response delay of the humidity sensor caused by the temperature around the humidity sensor is compensated for by use of the detection value of the temperature sensor. As a result, it is possible to improve detection accuracy of the humidity sensor.

PRIOR ART LITERATURES

Patent Literature

Patent Literature 1: JP Patent No. 2526872

SUMMARY OF INVENTION

The present inventors considered the response delay of the humidity sensor and studied cases that mount a humidity detector, for example, to an inner surface of the windshield above a rearview mirror. The humidity detector has a sensor case that is provided with ventilation slits and houses a humidity sensor.

The defogging control is performed to maintain the windshield clear for securing a passenger's view. Accordingly, when using a detected humidity detected by the humidity detector in the defogging control, the humidity detector is required to detect a relative humidity of air in a center area of the inner surface of the windshield where coincide with a field of the passenger's view, not a relative humidity of air in an upper area of the inner surface located above the rearview mirror.

Therefore, the humidity detector needs to obtain the relative humidity of the air outside the sensor case in the vehicle compartment by using the humidity sensor that is housed in the sensor case.

The sensor case has the ventilation slits through which an inside and an outside of the sensor case communicate with each other, whereby air flows between the inside and the outside. Thus, an air flow is caused around the humidity sensor.

The humidity sensor has a unique characteristic in that the response delay changes depending on an air volume and a flow direction of the air flowing around the humidity sensor.

For example, when the air volume of the air flowing around the humidity sensor is large, a response delay time of an output signal of the humidity sensor becomes short. On the other hand, when the air volume of the air flowing around the humidity sensor is small, the response delay time of the output signal of the humidity sensor becomes long.

In addition, the sensor case interrupts the air flowing from the outside of the sensor case toward the humidity sensor. Therefore, the sensor case also causes the response delay of the humidity sensor.

That is, the response delay of the humidity sensor is caused by the sensor case, the air volume of the air flowing around the humidity sensor, and the flow direction of the air flowing around the humidity sensor.

The present disclosure addresses the above issues, and thereby it is an objective of the present disclosure to provide a humidity detector that can compensate for a response delay of a humidity sensor. The response delay is caused due to a sensor case, a flow direction and an air volume of air around the humidity sensor.

According to an aspect of the present disclosure, a humidity detector has a sensor case and a humidity sensor. The sensor case is located inside a vehicle compartment and has an air inlet through which an air flows into the sensor case from the vehicle compartment. The humidity sensor is housed in the sensor case and detects a relative humidity of the air. The humidity detector has an air volume obtaining section, a flow direction obtaining section, a setting section, and a correction section. The air volume obtaining section obtains air volume information correlated with an air volume of the air flowing around the humidity sensor. The flow direction obtaining section obtains flow direction information correlated with a flow direction of the air flowing around the humidity sensor. The setting section sets a correction factor, which is applied to a dynamic compensator, based on the air volume information and the flow direction information. The dynamic compensator compensates for a response delay of the humidity sensor caused due to the sensor case and changing due to the air volume and the flow direction. The correction section corrects a detection value, which is detected by the humidity sensor, by using the dynamic compensator to obtain the relative humidity of the air outside the sensor case in the vehicle compartment.

According to the above-described configuration, the humidity detector can compensate the response delay of the humidity sensor. As a result, the humidity detector can detect the relative humidity of the air from the vehicle air compartment at the outside of the sensor case.

BRIEF DESCRIPTION OF DRAWINGS

FIG. 11 is a characteristic table used for calculation of correction factors in the operation processing by the operation circuit in the second embodiment.

FIG. 13 is a characteristic table used for calculation of correction factors in operation processing by an operation circuit in another embodiment.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

Figure 1:
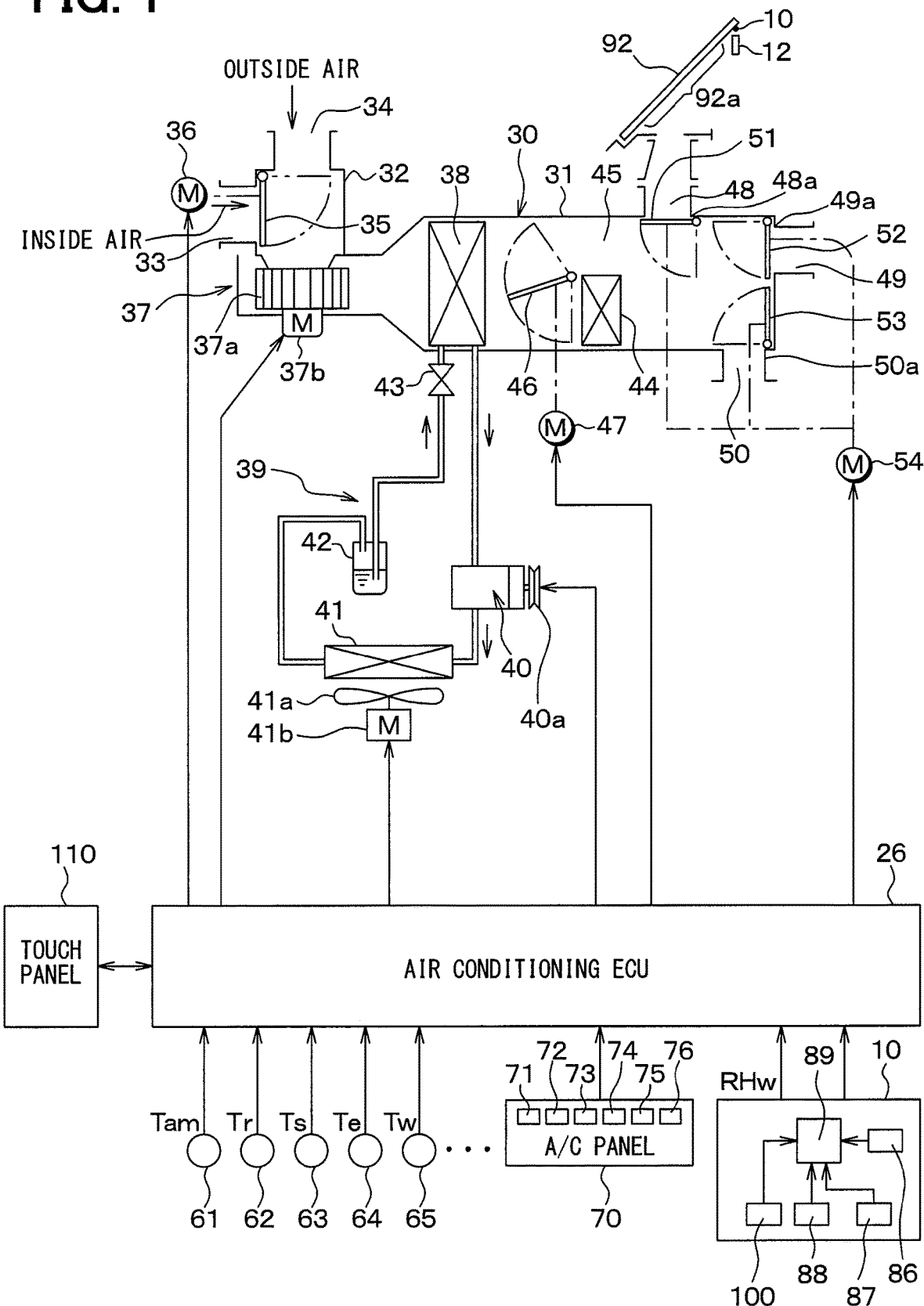
FIG. 1 is a diagram illustrating an overall configuration of an air conditioner for a vehicle in a first embodiment.

FIG. 1 illustrates a schematic configuration of an air conditioner for a vehicle according to a first embodiment. The air conditioner is, in other words, an air conditioner that is mounted to a vehicle and performs an air conditioner for a vehicle compartment.

The air conditioner for the vehicle includes an interior air conditioning unit 30. The interior air conditioning unit 30 is disposed inside a dashboard panel (i.e., instrument panel) at a most front portion in a vehicle compartment. The interior air conditioning unit 30 has a case 31. The case 31 defines an air passage therein, and air flows in the air passage toward an inside of the vehicle compartment.

An inside/outside air switching box 32 is disposed at a most upstream portion in the air passage in the case 31 to switch between opening and closing of an inside air introducing port 33 and an outside air introducing port 34 by use of an inside/outside air switching door 35. The inside/outside air switching door 35 is driven by a servomotor 36.

An electric blower 37 that blows the air toward the inside of the vehicle is disposed on a downstream side of the inside/outside air switching box 32. The blower 37 has a centrifugal blower fan 37a that is driven by a motor 37b. An evaporator 38, which serves as a cooling heat exchanger that cools air blown by the blower 37, is disposed on a downstream side of the blower 37.

The evaporator 38 is one of components configuring a refrigeration cycle device 39, and cools the air in a manner that low-temperature low-pressure refrigerant absorbs heat from the air and evaporates moisture from the air. The refrigeration cycle device 39 is a known device and configured so that the refrigerant circulates from a discharge side of a compressor 40 to the evaporator 38 through a condenser 41, a liquid receiver 42, and an expansion valve 43 forming a pressure reducing unit. Outside air (i.e., cooling air) is blown to the condenser 41 by an electric cooling fan 41a. The cooling fan 41a is driven by a motor 41b.

In the refrigeration cycle device 39, the compressor 40 is driven by an engine for traveling (not shown) via an electromagnetic clutch 40a. Therefore, by energizing and stopping the energization of the electromagnetic clutch 40a, it is possible to perform on-and-off control of actuation of the compressor 40.

On the other hand, in the interior air conditioning unit 30, a heater core 44 that heats the air flowing in the case 31 is disposed on a downstream side of the evaporator 38. The heater core 44 is a heating heat exchanger that heats air (i.e., cool air) which has passed through the evaporator 38 by using warm water of a vehicle engine (i.e., engine cooling water) as a heat source. A bypass passage 45 is formed beside the heater core 44 and the air bypassing the heater core 44 flows through the bypass passage 45.

An air mix door 46 that forms a temperature adjusting unit is rotatably disposed between the evaporator 38 and the heater core 44. The air mix door 46 is driven by a servomotor 47 and a rotating position (i.e., an opening degree) of the air mix door 46 can be adjusted continuously.

A ratio between an amount of air passing through the heater core 44 (i.e., a warm air volume) and an amount of air passing through the bypass passage 45 while bypassing the heater core 44 (i.e., a cool air volume) is adjusted by use of the opening degree of the air mix door 46. In this way, a temperature of the air blown out into the vehicle compartment is adjusted.

Three outlets, i.e., a defroster air outlet 48, a face air outlet 49, and a foot outlet 50 are provided at a most downstream portion of the air passage in the case 31. The defroster air outlet 48 blows out the conditioned air toward windshield 92 of the vehicle. The face air outlet 49 blows out the conditioned air toward a face of an occupant. The foot outlet 50 blows out the conditioned air toward feet of the occupant.

In other words, opening defining portions 48a, 49a, and 50a that respectively form the defroster air outlet 48, the face air outlet 49, and the foot outlet 50 are provided to the case 31.

A defroster door 51, a face door 52, and a foot door 53 are rotatably disposed on upstream sides of the air outlets 48, 49, and 50. The blowing mode doors 51 to 53 are opened and closed by a common servomotor 54 via linkages (not shown).

An air conditioner ECU 26 is an electronic control unit that is configured by a known microcomputer including a CPU, a ROM, RAM, and the like and a peripheral circuit of the microcomputer. The air conditioner ECU 26 stores computer programs for air conditioning control in the ROM and performs various operations and processing based on the computer programs. Each of the ROM and the RAM is a non-transitory tangible storage medium.

The air conditioner ECU 26 receives inputs of detection signals from a group of known air conditioning sensors 61 to 65 and various operation signals from an air conditioning operation panel 70, in addition to an output signal of a humidity detector 10 (described later).

Specifically, the group of air conditioning sensors includes an outside air sensor 61 that detects an outside air temperature Tam (i.e., temperature outside the vehicle compartment), an inside air sensor 62 that detects an inside air temperature Tr (i.e., temperature inside the vehicle compartment), a solar sensor 63 that detects an amount of insolation Ts into the vehicle compartment, an evaporator temperature sensor 64 that is disposed at an air outlet of the evaporator 38 and detects an evaporator outlet temperature Te, a water temperature sensor 65 that detects a temperature Tw of the warm water (i.e., engine cooling water) flowing into the heater core 44, and the like.

The air conditioning operation panel 70 is provided, as various air conditioning operation members, with a temperature setting switch 71 forming a temperature setting unit that sets a temperature in the vehicle compartment, a blowing mode switch 72 that manually sets a blowing mode switched by the blowing mode doors 51 to 53, an inside/outside air switching switch 73 that manually sets an inside/outside air suction mode by use of the inside/outside air switching door 35, an air conditioning switch 74 that outputs an actuation command signal for the compressor 40 (i.e., an ON signal for the electromagnetic clutch 40*a*), a blower actuating switch 75 that manually sets an air volume of the blower 37, an automatic switch 76 that outputs a command signal for an air conditioning automatic control state, and the like.

As the blowing modes of the present embodiment, a face mode (i.e., FACE), a foot mode (i.e., FOOT), a bi-level mode, a foot-defroster mode (i.e., F/D), a defroster mode (i.e., DEF), and the like are employed.

The face mode is a mode in which the face air outlet 49 is opened and the foot outlet 50 and the defroster air outlet 48 are closed. The foot mode is a mode in which the face air outlet 49 is closed, the foot outlet 50 is opened, and the defroster air outlet 48 is slightly opened. The bi-level mode is a mode in which the face air outlet 49 and the foot outlet 50 are opened and the defroster air outlet 48 is closed. The foot-defroster mode is a mode in which the face air outlet 49 is closed, the foot outlet 50 is opened, and the defroster air outlet 48 is slightly opened. The defroster mode is a mode in which the face air outlet 49 is closed, the foot outlet 50 is slightly opened, and the defroster air outlet 48 is opened.

The electromagnetic clutch 40*a* of the compressor 40, the servomotors 36, 47, and 54 that form electric drive units of the respective devices, the motor 37*b* of the blower 37, the motor 41*b* of the cooling fan 41*a* that cools the condenser, and the like are connected to an output side of the air conditioner ECU 26. Actuation of the devices is controlled by output signals from the air conditioner ECU 26.

A touch screen 110 is connected to the air conditioner ECU 26. The touch screen 110 is formed by combining a display image panel with a transparent switch panel that receives touch operation from a user.

Next, a configuration of the humidity detector 10 of the present embodiment will be described with reference to FIGS. 2 and 3.

Figure 2:
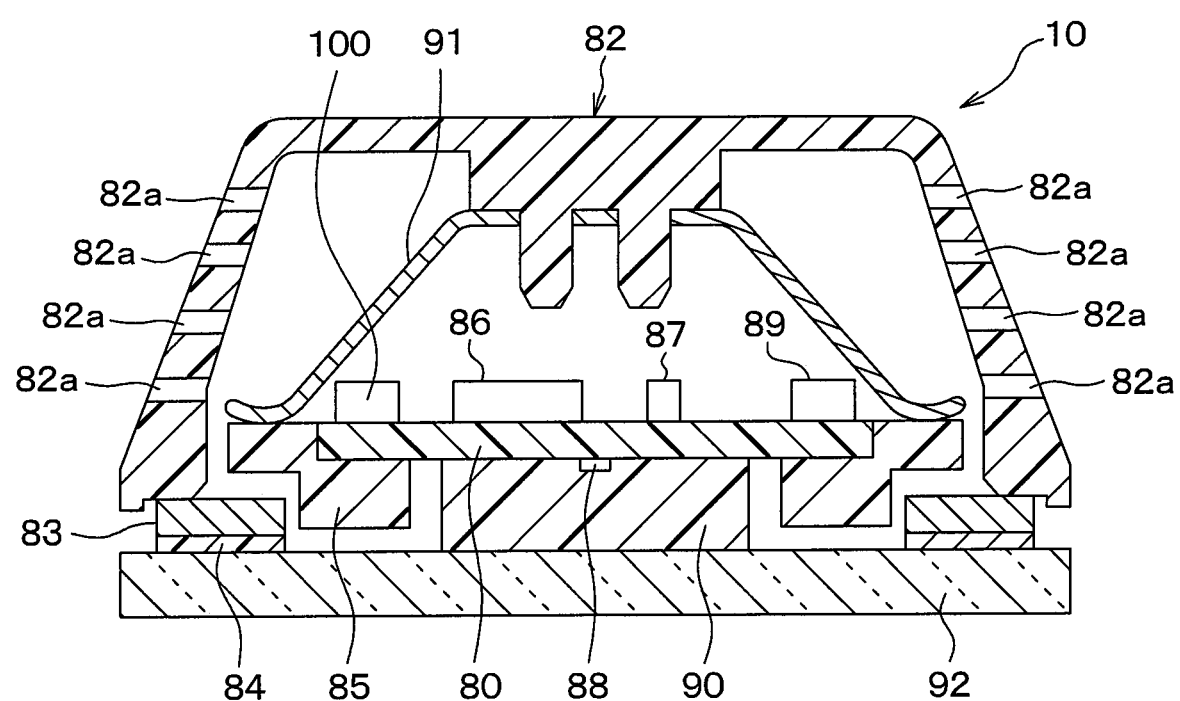
FIG. 2 is a sectional view illustrating an inner configuration of a humidity detector in FIG. 1.
Figure 3:
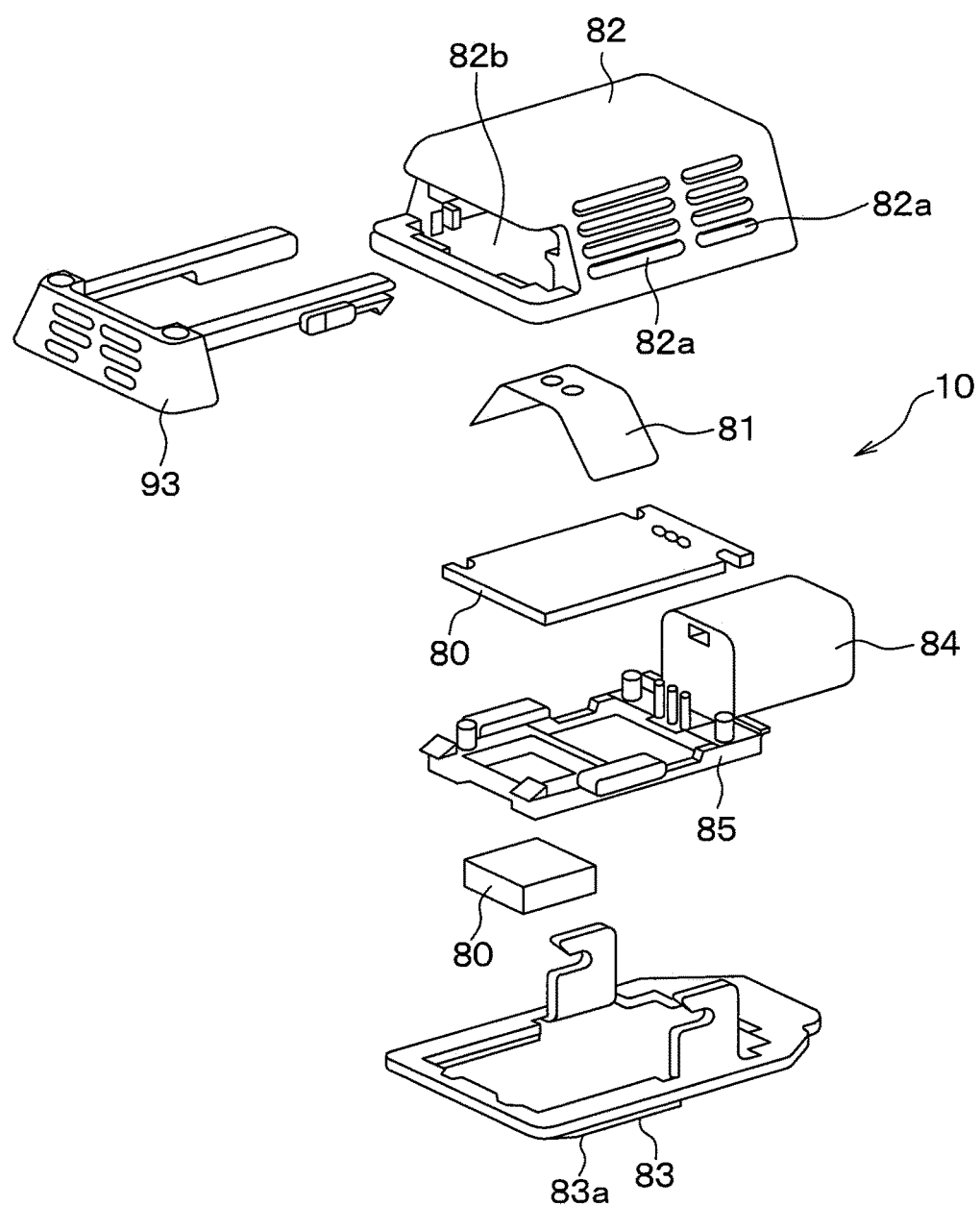
FIG. 3 is an exploded view illustrating the humidity detector in FIG. 1.

FIG. 2 is a schematic sectional view illustrating a state in which the humidity detector 10 is mounted to the inner surface of the windshield (specifically, the windshield) of the vehicle and FIG. 3 is an exploded view illustrating the humidity detector 10.

A sensor case of the humidity detector 10 is formed by a sensor case 82, a bracket 83, and a stopper 93. The sensor case 82 is made of resin and has a thin and substantially rectangular parallelepiped shape with a small height. As shown in FIG. 2, ventilation slits 82*a* are formed in side walls of the sensor case 82 so that the air in the vehicle compartment as an installation environment flows inside. The bracket 83 is made of metal and has a flat plate shape with a central portion open.

The windshield 92 is a windshield of the vehicle, for example, an upper surface in FIG. 2 serves as the inner surface facing the inside of the vehicle compartment, and a lower surface in FIG. 2 serves as an outer surface facing an outside of the vehicle compartment. The humidity detector 10 is fixed by being stuck with an adhesive sheet 83*a* onto a portion of the inner surface of the windshield 92 above a rearview mirror 12. The adhesive sheet 83*a* is a double-sided adhesive sheet having a thickness of about 0.5 mm and the bracket 83 and the windshield 92 are stuck to each other with the adhesive sheet 83*a*. In other words, the humidity detector 10 is disposed at the upper portion of the inner surface of the windshield 92.

The sensor case 82 is disposed to the inner surface of the windshield 92 and houses a humidity sensor 86 therein, an air temperature sensor 87, and a glass temperature sensor 88. A circuit board 80 is positioned to be parallel to the inner surface of the windshield 92 in the sensor case 82. The circuit board 80 is fastened and fixed to a base 85, for example, with screws in the sensor case 82. The circuit board 80 is a member generally called "printed board" that configures a conductor circuit unit on an insulated board. The circuit board 80 is mounted with sensors, devices, and the circuit unit.

The glass temperature sensor 88 is mounted onto a face of the circuit board 80 close to the windshield 92, i.e., the surface close to the bracket 83. The humidity sensor 86, the air temperature sensor 87, a connector 84, an operation circuit 89, a flow speed sensor 100, and the like are mounted onto a face of the circuit board 80 opposite from the windshield 92, i.e., the surface close to the sensor case 82.

The humidity sensor 86 is mounted onto the circuit board 80 and detects a relative humidity around the humidity sensor 86. The relative humidity around the humidity sensor 86 of the present embodiment refers to the relative humidity of the air in the sensor case 82. In the present embodiment, a variable capacitance humidity sensor in which permittivity of a moisture sensitive film changes according to a relative humidity of air and, as a result, a capacitance changes according to the relative humidity of the air is used as the humidity sensor 86.

The air temperature sensor 87 is mounted onto the surface (i.e., an upper side in FIG. 2) of the circuit board 80 and detects an air temperature around the humidity sensor 86. The glass temperature sensor 88 is mounted onto the surface (i.e., a lower side in FIG. 2) of the circuit board 80 and detects a temperature of the windshield 92. The air temperature sensor 87 and the glass temperature sensor 88 are disposed at a center of the circuit board 80 to be as close as possible to the humidity sensor 86 so that the temperature and the relative humidity of the representative air around the inner surface of the windshield 92 and the representative temperature of the inner surface of the windshield 92 can be detected under as equal environmental conditions as possible. A thermistor having a resistance that changes according to the temperature is used for each of the temperature sensors 87 and 88. The flow speed sensor 100 detects a flow speed of an air flowing around the humidity sensor 86. A hot-wire anemometer can be used as the flow speed sensor 100 of the present embodiment, for example. In the hot-wire anemometer, a hot wire is exposed to the environment and energized and a flow speed is obtained from a temperature at which heat generation and cooling by the wind balance with each other.

A heat conductive member 90 that supports the circuit board 80 is provided to be in contact with the windshield 92 and the glass temperature sensor 88. The heat conductive member 90 is a member such as a heat conductive sheet, heat conductive gel, heat conductive grease, and the like.

An elastic member 91 is provided in the sensor case 82. As an example, the elastic member 91 is a flat spring. The flat spring has one end being in contact with the sensor case 82 and an other end being in contact with the base 85, thereby pressing the circuit board 80 toward the windshield 92 indirectly using elastic force of the elastic member 91. The elastic member 91 and the circuit board 80 are in contact with each other in an outer periphery of the circuit board 80. The circuit board 80 is retained by the base 85 provided in the outer periphery of the circuit board 80. The base 85 is a portion that protects the outer periphery of the circuit board 80. The elastic member 91 is in contact with the base 85. Thus, it is suppressed that the elastic member 91 applies stress to the circuit board 80 directly.

The elastic member 91 is in contact with the sensor case 82 at a portion located above the center of the circuit board 80. Therefore, the elastic member 91 has a substantially L shape, such that a bent portion of the elastic member is in contact with an upper portion of the sensor case 82. The elastic member 91 and the sensor case 82 are locked to each other by fitting.

As described above, the sensor case 82 is fitted with the bracket 83 while pressing the circuit board 80 through the elastic member 91. The sensor case 82 is locked and fixed by the stopper 93 that is inserted into an insertion opening 82*b* defined in a side portion of the sensor case 82. Specifically, the sensor case 82 is attached to the bracket 83, and then the stopper 93 is slid into the insertion opening 82*b* of the sensor case 82. The bracket 83 has a click, and the stopper 93 engages with the click when the stopper 93 is inserted into the insertion opening 82*b*. As a result, the stopper 93 engages with the sensor case 82 through the insertion opening 82*b*. Thus, the sensor case 82 and the bracket 83 are fixed to each other.

The connector 84 is fastened and fixed to the base 85 by screws. Terminals of the connector 84 are joined to the circuit board 80 by soldering.

In the state in which the glass temperature sensor 88 is pressed by the elastic member 91, the glass temperature sensor 88 is pressed against the heat conductive member 90 to such a degree as to slightly sink into the heat conductive member 90. The heat conductive member 90 has a thickness that is greater than a total thickness of a thickness of the adhesive sheet 83*a* and a thickness of the bracket 83. In this way, when the humidity detector 10 is stuck to the inner surface of the windshield 92, the heat conductive member 90 is reliably pressed against the inner surface of the windshield 92 by the elastic member 91. Therefore, the temperature of the windshield 92 is transferred to the glass temperature sensor 88 via the heat conductive member 90 and detected.

Next, an electrical configuration of the humidity detector 10 will be described.

The operation circuit 89 is configured by a microcomputer, a memory, and the like. The operation circuit 89 performs the operation processing of the relative humidity RHw adjacent to the windshield 92 according to a computer program stored in advance in the memory.

The operation processing calculates the relative humidity RHw that is a relative humidity near the inner surface of the windshield based on a flow direction information and an air volume information, which are obtained from the air conditioner ECU 26, and output signals from the sensors 86, 87, 88.

Here, the sensors 86, 87, and 88 are generic names for the air temperature sensor 87, the humidity sensor 86, and the glass temperature sensor 88. The flow direction information of the present embodiment is information correlated with a flow direction of the air flowing around the humidity sensor 86. According to the present embodiment, a blowing mode currently being performed is employed as the flow direction information. The air volume information of the present embodiment is information showing the blower level that is the volume of the air blown by the blower 37, and is correlated with the air volume of the air flowing around the humidity sensor 86.

Figure 4:
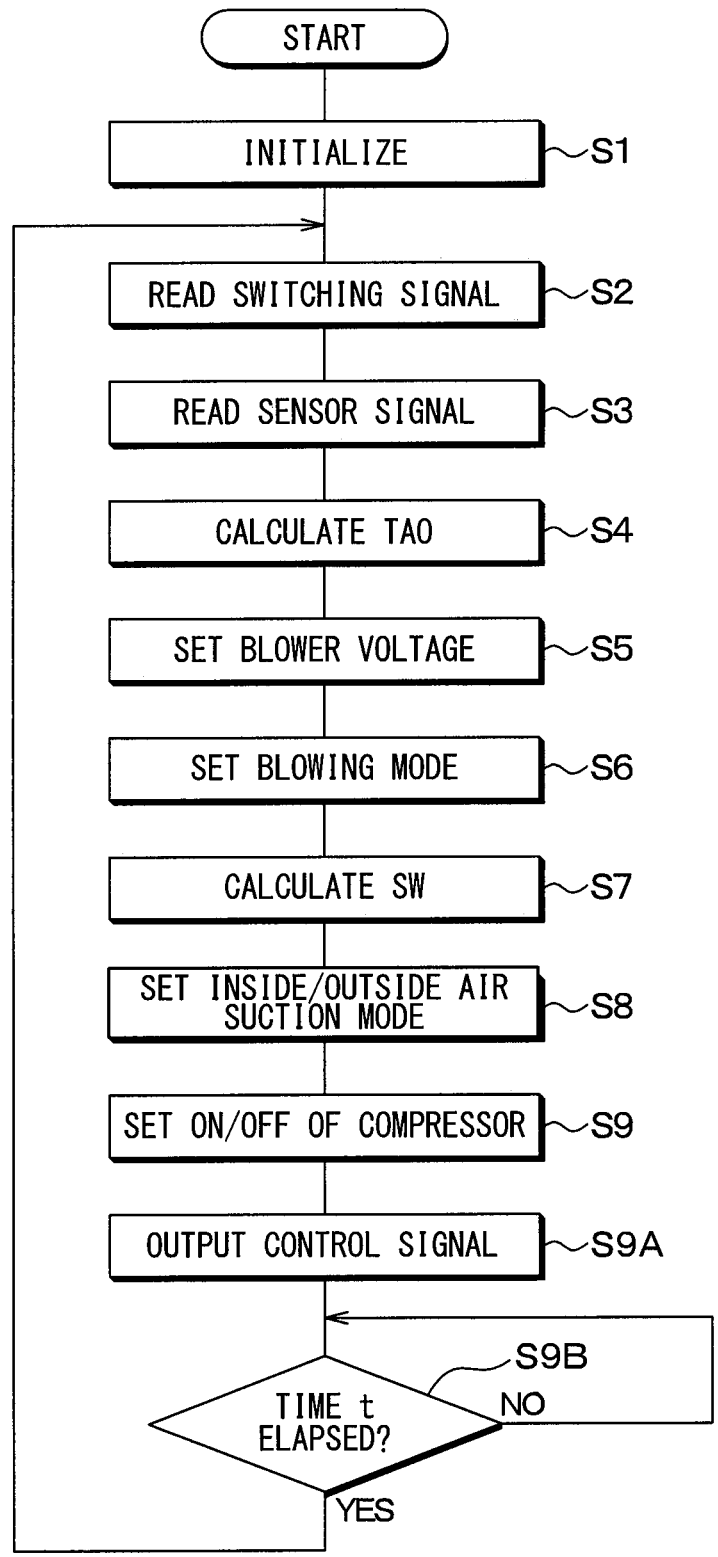
FIG. 4 is a flowchart illustrating air conditioning control processing in an air conditioner ECU in FIG. 1.

Air conditioning control processing performed by the air conditioner ECU 26 will be described hereafter with reference to FIG. 4. FIG. 4 is a flowchart illustrating the basic air conditioning control processing by the air conditioner ECU 26.

When an ignition switch is turned on and DC power is fed from a battery to the air conditioner ECU 26, the air conditioner ECU 26 starts a routine in FIG. 4 and initializes settings in step S1. Then, the air conditioner ECU 26 reads switch signals from the switches such as the temperature setting switch 71 in step S2.

Then, in step S3, signals obtained by A/D conversion of sensor signals from the inside air sensor 62, the outside air sensor 61, the solar sensor 63, the evaporator temperature sensor 64, and the water temperature sensor 65 are read.

Next, in step S4, a target blowing temperature TAO of the air to be supplied into the vehicle compartment is calculated using the following Equation A stored in advance in the ROM.

$$TAO = Kset \times Tset - KR \times TR - KAM \times TAM - KS \times TS + C \quad \text{(Equation A)}$$

The target blowing temperature TAO is an air temperature at which blowing from the air outlets 48, 49, 50 is required to maintain the temperature in the vehicle compartment at a set temperature Tset.

Tset is the set temperature set by the temperature setting switch 71, TR is the inside air temperature detected by the inside air sensor 62, TAM is the outside air temperature detected by the outside air sensor 61, and TS is an amount of insolation detected by the solar sensor 63. Kset, KR, KAM, and KS are gains and C is a constant for correction.

Then, in step S5, a warm-up control (i.e., a blower delay control) is performed. The warm-up control determines blower voltage corresponding to a cooling water temperature TW detected by the water temperature sensor 65 by use of a characteristic diagram stored in advance in the memory is carried out. The warm-up control is carried out in the winter season in which the outside air temperature is low or when the blowing mode is the B/L mode or the FOOT mode. The blower voltage is a voltage to be applied to the motor 37*b* for the blower fan 37*a*.

When the cooling water temperature TW increases to 60° C. or higher, for example, the blower voltage (i.e., the voltage to be applied to the motor 37*b* for the blower fan 37*a*) corresponding to the target blowing temperature TAO is determined based on the characteristic diagram stored in advance in the memory.

The blower voltage determined as described above and the volume of the air blown by the blower 37 are in a one-to-one correspondence relationship to each other. The volume of the air will be referred to as a "blower level".

Next, in step S6, the blowing mode is determined based on the target blowing temperature TAO and the output signal of the blowing mode switch 72.

When the user does not manually set the blowing mode switch 72, one of the face mode, the bi-level mode, and the foot mode is determined as the blowing mode to be performed by use of the characteristic diagram stored in advance in the memory and based on the target blowing temperature TAO.

On the other hand, when the user manually sets the blowing mode using the blowing mode switch 72, the one manually set mode is determined as the blowing mode to be performed.

Thus, the air conditioner ECU 26 determines the blowing mode to be performed, on the basis of the manual setting through the blowing mode switch 72 and the target blowing temperature TAO.

Then, in step S7, a target door opening degree SW of the air mix door 46 is calculated based on following Equation B stored in the ROM in advance.

$$SW=\{(TAO-TE)/(TW-TE)\}\times 100 [\%] \quad \text{(Equation B)}$$

TE is a temperature of air at an outlet of the evaporator 38 and is detected by the evaporator temperature sensor 64 immediately after the air passes through the evaporator 38. The temperature of the air at the outlet of the evaporator 38 will be referred to as the evaporator outlet temperature TE hereafter. TW is a temperature of cooling water and is detected by the water temperature sensor 65.

When it is determined that an equation SW 0 [%] is satisfied, the air mix door 46 is controlled to be in such a position as to cause the entire cool air from the evaporator 38 to bypass the heater core 44 (i.e., a MAXCOOL position). When it is determined that an equation SW 100 [%] is satisfied, the air mix door 46 is controlled to be in such a position as to cause the entire cool air from the evaporator 38 to pass through the heater core 44 (i.e., a MAXHOT position).

When it is determined that an equation 0 [%]<SW<100 [%] is satisfied, the air mix door 46 is controlled to be in such a position as to cause a part of the cool air from the evaporator 38 to pass through the heater core 44 and a remaining part of the cool air to bypass the heater core 44.

Next, in step S8, the inside/outside air suction mode is determined based on setting of the inside/outside air switching switch 73 on the air conditioning operation panel 70 and the relative humidity RHw. Details of the inside/outside air suction mode will be described later.

In step S9, an operation state of the compressor 40 is determined while the air conditioning switch 74 is turned ON. That is, it is determined whether to start the compressor 40 or to stop the compressor 40 based on the evaporator outlet temperature TE detected by the evaporator temperature sensor 64. Specifically, when the evaporator outlet temperature TE detected by the evaporator temperature sensor 64 is a first frosting temperature (e.g., 4° C.) or higher, the electromagnetic clutch 40a is energized, i.e., turned ON, to start the compressor 40, i.e., to turn the compressor 40 ON, whereby an operation of the refrigeration cycle device 39 is started. That is, an operation of the evaporator 38 is started. On the other hand, when the evaporator outlet temperature TE detected by the evaporator temperature sensor 64 is lower than a second frosting temperature (e.g., 3° C.), which is lower than the first frosting temperature, the energization of the electromagnetic clutch 40a is stopped, i.e., the electromagnetic clutch 40a is turned OFF, to stop the operation of the compressor 40, i.e., to turn the compressor 40 OFF, whereby the operation of the refrigeration cycle device 39 is stopped. That is, the operation of the evaporator 38 is stopped, whereby a cooling performance of the evaporator 38 cooling the air is stopped.

Then, in step S9A, control signals are output to the actuators 36, 47, and 54, the motor 37b for the blower fan 37a, and the electromagnetic clutch 40a so as to obtain the controlled states calculated or determined in steps S5 to S9.

Then, in step S9B, whether or not a control cycle time t (e.g., 0.5 second to 2.5 seconds (inclusive)) or a longer time has elapsed since the reading processing in step S2 started (hereinafter referred to as "elapsed time") is determined.

When the elapsed time is shorter than the control cycle time t, a result of the determination in step S9B is NO and the air conditioning control processing returns to step S9B. Therefore, as long as the elapsed time is shorter than the control cycle time t, the NO determination in step S9B is repeated. Then, when the elapsed time is equal to or longer than the control cycle time t, the result of the determination in step S9B is YES and the air conditioning control processing returns to step S2. Then, the processing in each of steps S2 to S9, S9A, and S9B is repeated.

Next, the operation processing of the operation circuit 89 in the humidity detector 10 will be described with reference to FIGS. 5 to 7.

Figure 5:
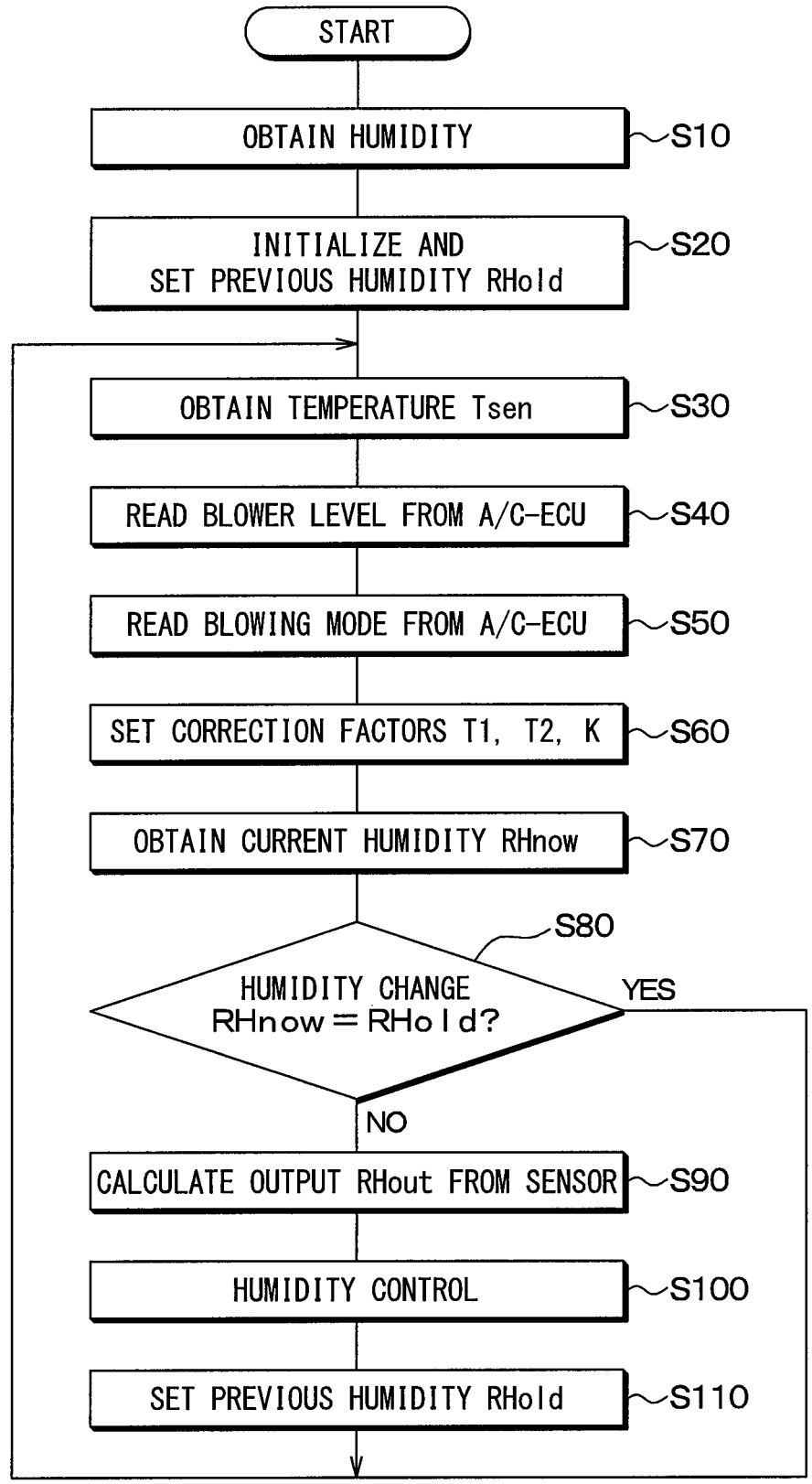
FIG. 5 is a flowchart illustrating operation processing by a operation circuit in FIG. 1.

The operation circuit 89 performs the operation processing according to a flowchart in FIG. 5. The operation processing is started when the ignition switch is turned on and the DC power is fed from the battery to the operation circuit 89.

First, in step S10, the output signal of the humidity sensor 86 is obtained. The output signal of the humidity sensor 86 represents the relative humidity around the humidity sensor 86 in the sensor case 82. As a result, the relative humidity around the humidity sensor 86 is obtained.

Next, in step S20, the relative humidity obtained in step S10 is set as RHold (m) that is a humidity around the sensor. The "m" enclosed in parentheses represents the number of times step S20 is performed.

Next, in step S30, the output signal of the air temperature sensor 87 is obtained. The output signal of the air temperature sensor 87 represents a temperature Tsen around the humidity sensor 86 in the sensor case 82. Therefore, the temperature Tsen around the humidity sensor 86 is obtained.

Next in step S40, the blower level of the blower 37 is obtained from the air conditioner ECU 26. The blower level is the air volume information correlated with the air volume of the air flowing around the humidity sensor 86.

Next, in step S50, the blowing mode currently performed by the air conditioner ECU 26 is obtained from the air conditioner ECU 26. The blowing mode is the flow direction information correlated with the flow direction of the air flowing around the humidity sensor 86.

The humidity detector 10 of the present embodiment is mounted to the portion of the inner surface of the windshield 92 close to an end such as the portion above the rearview mirror 12, for example. However, in order to perform a defogging control of the windshield 92, it is necessary to obtain a relative humidity of air in a central area 92a of the inner surface of the windshield 92 which overlaps with a field of view of a driver as shown in FIG. 1. Therefore, it is necessary for the humidity detector 10 to obtain the relative humidity of the air outside the sensor case 82.

Since the sensor case 82 is provided with the ventilation slits 82a, the air flows into and flows out of the sensor case 82 through the ventilation slits 82a and the air flows around the humidity sensor 86.

Here, the humidity sensor 86 has a unique characteristic in that a response delay changes depending on an air volume and a flow direction of the air flowing around the humidity sensor 86 in the sensor case 82.

The volume of the air around the humidity sensor 86 changes depending on the blower level. The flow direction of the air, which flows around the humidity sensor 86, changes depending on the blowing mode. Therefore, the response delay of the humidity sensor 86 caused by the sensor case 82 changes depending on the blower level and the blowing mode.

Moreover, the sensor case 82 prevents the air outside the sensor case 82 from reaching the humidity sensor 86. Therefore, the response delay of the humidity sensor 86 is caused by the sensor case 82 as well.

In addition, the response delay that changes depending on the temperature around the humidity sensor 86 is caused in the humidity sensor 86 of the present embodiment. The response delay of the humidity sensor 86 that changes depending on the temperature around the humidity sensor 86 is considered to be caused by a factor unique to the humidity sensor 86.

In this manner, the response delay of the humidity sensor 86 is caused by the temperature of the humidity sensor 86, the air volume and the flow direction of the air flow around the humidity sensor 86, and the sensor case 82.

Therefore, in the present embodiment, the response delay of the humidity sensor 86 is corrected by using a dynamic compensator calculated by the following Expression 2.

$$\text{Dynamic Compensator} = \frac{(T1 \cdot S + 1) \times (T2 \cdot S + 1)}{(K1 \cdot S + 1) \times (P \cdot S + 1)} \quad \text{[Expression 2]}$$

The dynamic compensator of the present embodiment is a function that uses S, which is a complex number, as a variable number.

The dynamic compensator is configured by a function $[(T1 \cdot S+1) \times (T2 \cdot S+1)/(K1 \cdot S+1)]$ compensating for the response delay of the humidity sensor 86 and a low-pass filter $[1/(P \cdot S+1)]$ filtering the output signal of the humidity sensor 86.

The output signal, which is output from the humidity sensor 86 after correcting the response delay of the humidity sensor 86 by using the dynamic compensator, will be referred to as "a corrected output signal from the humidity sensor 86" hereinafter for explanation purpose. The low-pass filter is a filter that attenuates a frequency component of the output signal from the humidity sensor 86, the frequency component being equal to or higher than a specified frequency, and passes a frequency component of the output signal lower than the specified frequency. In other words, the low-pass filter is the filter that filters the output signal from the humidity sensor 86 to attenuate a high-frequency noise component being equal to or higher than the specified frequency. P is a specified constant and is a value for determining the specified frequency that is a cutoff frequency of the low-pass filter.

Correction factors K1 and T1 are changed depending on the flow direction and the air volume of the air flowing around the humidity sensor 86. A correction factor T2 is a correction factor that changes depending on the temperature of the humidity sensor 86.

Here, RHout(m) represents the corrected output signal, which is output from the humidity sensor 86 after being corrected using the dynamic compensator, and RHnow(m) represents the output signal, which is output from the humidity sensor 86 before being corrected using the dynamic compensator. Then, a relationship between RHnow (m) and RHout(m) is shown by the following Expression 3.

$$\frac{RHout}{RHnow} = \frac{(T1 \cdot S + 1) \times (T2 \cdot S + 1)}{(K1 \cdot S + 1) \times (P \cdot S + 1)} \quad \text{[Expression 3]}$$

Next, in step S60, the correction factors K1, T1, and T2 that configure the dynamic compensator are set.

Figures 6, 7:
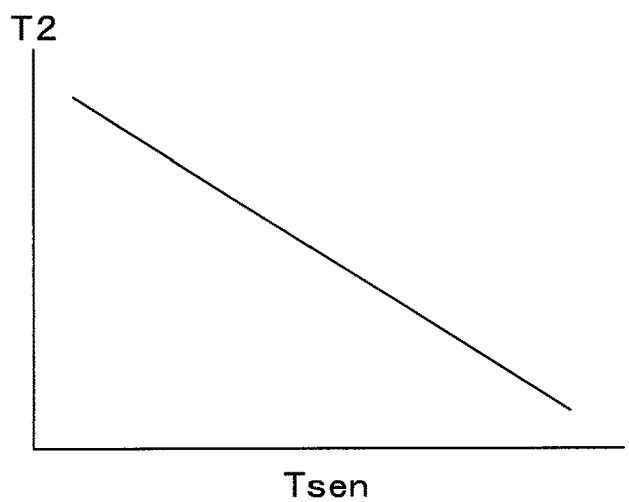
FIG. 6 is a characteristic table used for calculation of correction factors in the operation processing by the operation circuit in FIG. 1.
FIG. 7 is a graph illustrating a function used for the calculation of the correction factors in the operation processing by the operation circuit in FIG. 1.

First, with reference to a characteristic table stored in advance in the memory and illustrated in FIG. 6, the correction factors K1 and T1 corresponding to the blower level (BLE_LEV in FIG. 6) and the blowing mode (MODE in FIG. 6) obtained in step 40 and step S50 respectively are obtained.

In the characteristic table in FIG. 6, the blower level, the blowing mode, the correction factor K1, and the correction factor T1 are determined on a one-to-one basis to each other. As the blower levels in FIG. 6, a low level (i.e., Lo), a middle level (i.e., Mid), and a high level (i.e., Hi) are used. The blower level is set to increase from low, middle, to high, in this order. As the blowing modes, the face mode (i.e., FACE), the foot mode (i.e., FOOT), the foot/defroster mode (i.e., F/D), and the defroster mode (i.e., DEF) are used.

For example, when the blowing mode is the defroster mode (i.e., DEF) and the blower level is the middle level (i.e., Mid), the correction factor K1 is K1-11 and the correction factor T1 is T1-11.

Next, with reference to a characteristic table in FIG. 7 stored in advance in the memory, a correction factor T2 corresponding to the temperature Tsen around the humidity sensor 86 obtained in step S30 is obtained.

The characteristic table in FIG. 7 is a function showing a relationship between the temperature Tsen of the humidity sensor 86 and the correction factor T2. The correction factor T2 and the temperature Tsen around the humidity sensor 86 are determined on a one-to-one basis. In FIG. 7, the larger the temperature Tsen of the humidity sensor 86, the smaller the correction factor T2 becomes.

The correction factors K1, T1 obtained from the characteristic table in FIG. 6 and the correction factor T2 obtained from the characteristic table in FIG. 7 are set in the dynamic compensator.

In step S70, the output signal of the humidity sensor 86 is obtained as the relative humidity around the humidity sensor 86. In step S80, it is determined whether the relative humidity around the humidity sensor 86 has changed.

Specifically, the relative humidity around the humidity sensor 86 obtained this time is referred to as RHnow (m). It is determined whether RHold (m) set in step S20 is equal to RHnow (m). When RHold (m) and RHnow (m) are not equal to each other, a result of the determination in step S80 is NO, because the relative humidity around the humidity sensor 86 has changed. Then, the operation processing goes to step S90.

In step S90, RHnow(m) is substituted into Expression 3 to obtain RHout(m) which is the corrected relative humidity. RHout(m) obtained in this manner is a function having complex number S as the variable number. Therefore, "RHout(m) having complex number S as the variable number" is converted to "RHout(m) which is a function having time as a variable" by Laplace transformation or the like.

In step S100, the relative humidity RHw, which is the relative humidity near the inner surface of the windshield, is calculated based on RHout(m), the detected temperature detected by the air temperature sensor 87, and the detected temperature detected by the glass temperature sensor 88. In other words, by using a psychrometric chart, the relative humidity RHw can be calculated based on the relative humidity RH, the air temperature, and the temperature of the windshield 92. The operation circuit 89 outputs the relative humidity RHw, which is calculated in the above-described manner, to the air conditioner ECU 26. As a result, the air conditioner ECU 26 performs a humidity control. The humidity control will be described in detail later.

Then, in step S110, the operation circuit 89 sets RHnow (m), which is the relative humidity around the humidity sensor 86 and obtained in step S70, as RHold(m+1) to be used for determination in step S80 subsequently. Then, the operation processing returns to step S30.

When it is determined that RHold(m) and RHnow(m) are equal to each other in step S70, a result of the determination by the operation circuit 89 is YES, because the relative humidity around the humidity sensor 86 has not changed. In this case, the processing in each of steps S90, S100, and S110 is skipped and the operation processing returns to step S30.

After the operation processing returns to step S30, the processing for obtaining the temperature around the sensor in step S30, the blower level reading processing in step S40, the blowing mode reading processing in step S50, the correction factor setting processing in step S60, the processing for obtaining the humidity around the sensor in step S70, the humidity change determination in step S80, the sensor output operation processing in step S90, the humidity control processing in step S100, and the processing for setting the humidity around the sensor in step S110 are repeated, respectively.

Therefore, in step S80, every time the result of the determination is NO because the relative humidity around the humidity sensor 86 has changed in step S80, RHnow (m+r) is substituted into Expression 3 to obtain RHout(m+r) that is the relative humidity after the correction. The "r" enclosed in parentheses shows an integer according to the number of times steps S30 to S110 are repeated.

In step S100, the relative humidity RHw, which is the relative humidity near the inner surface of the windshield 92, is calculated based on RHout(m+r), the detected temperature detected by the air temperature sensor 87, and the detected temperature detected by the glass temperature sensor 88. The operation circuit 89 outputs the relative humidity RHw, which is calculated in the above-described manner, to the air conditioner ECU 26. Thus, the air conditioner ECU 26 performs the humidity control.

Next, details of the humidity control by the air conditioner ECU 26 in step S8 in FIG. 4 will be described.

First, when the inside/outside air suction mode is manually set for the inside/outside air switching switch 73, the air conditioner ECU 26 outputs the control signal for performing the manually set inside/outside air suction mode to the servomotor 36. In this way, the position of the inside/outside air switching door 35 is controlled by the servomotor 36 and the inside/outside air suction mode is performed.

The inside/outside air suction modes includes an inside air mode, an outside air mode, and an inside/outside air introducing mode. The inside air mode is a mode in which the inside air introducing port 33 is open and the outside air introducing port 34 is closed. The outside air mode is a mode in which the inside air introducing port 33 is closed and the outside air introducing port 34 is open. The inside/outside air introducing mode is a mode in which the inside air introducing port 33 and the outside air introducing port 34 are open.

On the other hand, when the inside/outside air suction mode is not set manually for the inside/outside air switching switch 73, the air conditioner ECU 26 obtains the relative humidity RHw from the humidity detector 10 and calculates an inside/outside air control command value S for determining a ratio between the inside air introduced from the inside air introducing port 33 and the outside air introduced from the outside air introducing port 34, based on the obtained relative humidity RHw and the like.

Here, the inside/outside air control command value S is information indicating the position of the inside/outside air switching door 35, i.e., the inside/outside air suction mode.

After step S8, the air conditioner ECU 26 outputs the control signal based on the inside/outside air control command value S to the servomotor 36 in step S9A. As a result, the position of the inside/outside air switching door 35 is controlled by the servomotor 36. In this manner, the ratio between the inside air introduced into the case 31 through the inside air introducing port 33 and the outside air introduced into the case 31 through the outside air introducing port 34 is controlled. As a result, the humidity of the air blown out from the air outlets 48, 49, and 50 into the vehicle compartment is controlled. The control of the humidity is similar to a humidity control (i.e., a defogging control) described in Japanese Patent No. 5,152,355. Therefore, details of the humidity control will not be described and description in the Description will be cited by reference. The higher the relative humidity RHw obtained from the humidity detector 10, for example, the more the air conditioner ECU 26 increases the ratio of the air volume of the outside air introduced into the case 31 through the outside air introducing port 34 to the air volume of the inside air introduced into the case 31 through the inside air introducing port 33.

A general operation of the present embodiment having the above-described configuration will be described hereafter. First, a general outline of operation of the interior air conditioning unit 30 will be described. By actuation of the blower 37, the air introduced from one or both of the inside air introducing port 33 and the outside air introducing port 34 is blown through the case 31 toward the inside of the vehicle compartment. The electromagnetic clutch 40a is energized and brought into an engaged state, and the compressor 40 is driven by the vehicle engine. As a result, the refrigerant circulates through the refrigeration cycle device 39.

The air flowing out of the blower 37 first passes through the evaporator 38 to be cooled and dehumidified and becomes a cool air. The cool air is then divided into a flow (i.e., a flow of warm air) passing through the heater core 44 and a flow (i.e., a flow of cool air) passing through the bypass passage 45 according to the rotating position (i.e., the opening degree) of the air mix door 46.

Therefore, the ratio between the amount of air passing through the heater core 44 (i.e., a warm air volume) and the amount of air passing through the bypass passage 45 (i.e., a cool air volume) is adjusted by changing the opening degree of the air mix door 46, whereby the temperature of the air to be supplied into the vehicle compartment can be adjusted.

Then, the conditioned air with the adjusted temperature is blown out into the vehicle compartment from at least one of the defroster air outlet 48, the face air outlet 49, and the foot outlet 50 positioned at the most downstream portion of the air passage in the case 31 to perform air conditioning in the vehicle compartment and defogging of the windshield 92 of the vehicle.

According to the above-described present embodiment, the humidity detector 10 includes the sensor case 82 that houses the humidity sensor 86 and has the ventilation slits 82a. However, the portion in which the humidity should be detected by the humidity sensor 86 (hereinafter referred to as "detection portion") is the central area 92a of the windshield 92 below the rearview mirror 12 and overlapping the field of view of the driver. Therefore, the humidity detector 10 is required to detect the relative humidity of the air outside the sensor case 82.

Although the conditioned air flows out of and into the sensor case 82 through the ventilation slits 82a, the sensor case 82 prevents the conditioned air outside the sensor case 82 from reaching the humidity sensor 86.

In this case, though the detected humidity by the humidity sensor 86 changes due to the conditioned air blown out from the air outlets 48, 49, and 50, the response delay of the output signal from the humidity sensor 86 occurs with respect to the humidity at the detection portion. Therefore, the response delay of the humidity sensor 86 changes depending on the flow direction and the air volume of the conditioned air flowing around the humidity sensor 86 in the sensor case 82.

Then, the operation circuit 89 of the present embodiment uses the dynamic compensator so as to correct the detection value of the humidity sensor 86 that detects the relative humidity of the air in the vehicle compartment. The operation circuit 89 obtains the blower level of the blower 37 correlated with the air volume of the conditioned air flowing around the humidity sensor 86 and obtains the blowing mode correlated with the flow direction of the conditioned air flowing around the humidity sensor 86. The operation circuit 89 sets the correction factors K1 and T1, which configure the dynamic compensate, based on the blower level and the blowing mode in order to compensate for the response delay of the humidity sensor 86, which changes depending on the air volume and the flow direction of the conditioned air flowing around the humidity sensor 86. The operation circuit 89 also sets the correction factor T2, which configures the dynamic compensator, based on the detected temperature detected by the air temperature sensor 87 in order to compensate for the response delay of the humidity sensor 86 that changes depending on the temperature around the humidity sensor 86. Then, the operation circuit 89 corrects the detection value of the humidity sensor 86 by using the dynamic compensator that is calculated using the correction factors K1, T1, and T2 being set as described above.

Thus, the response delay of the humidity sensor 86 can be compensated with high accuracy in the humidity detector 10. As a result, the relative humidity in the center area 92a (shown in FIG. 1) of the inner surface of the windshield 92 where overlapping with the field of view of the driver can be detected accurately.

Figure 8:
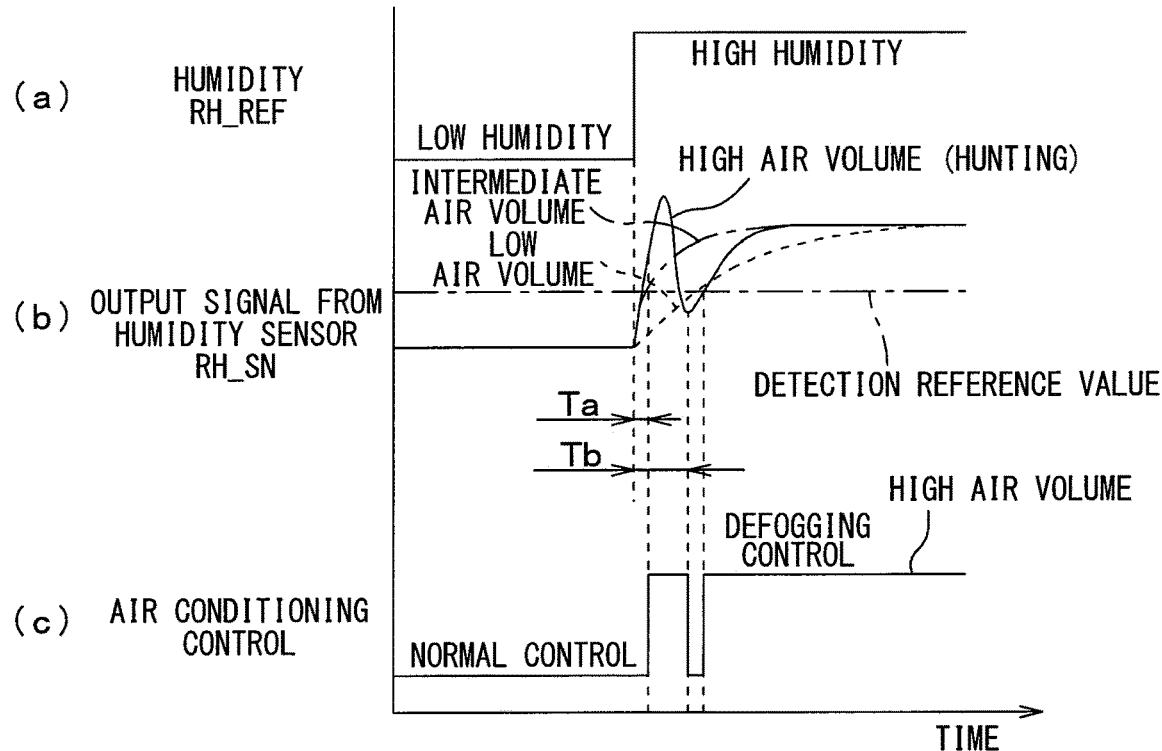
FIG. 8 is a timing chart illustrating a characteristic of a detection value of a conventional humidity sensor.

In FIG. 8, (a) illustrates change of the humidity RH_REF in the vehicle compartment, (b) illustrates change of an output signal RH_SN of a conventional humidity sensor 86, and (c) illustrates air conditioning control states. When the humidity RH_REF increases, the output signal RH_SN of the conventional humidity sensor 86 changes as illustrated in (b) of FIG. 8 due to the air volume of the air flowing around the humidity sensor 86. When the air volume is large, hunting occurs in the output signal RH_SN of the humidity sensor 86 and the air conditioning control becomes unstable.

On the other hand, when the air volume is small, response delay times are caused in the output signal RH_SN of the humidity sensor 86.

Figure 9:
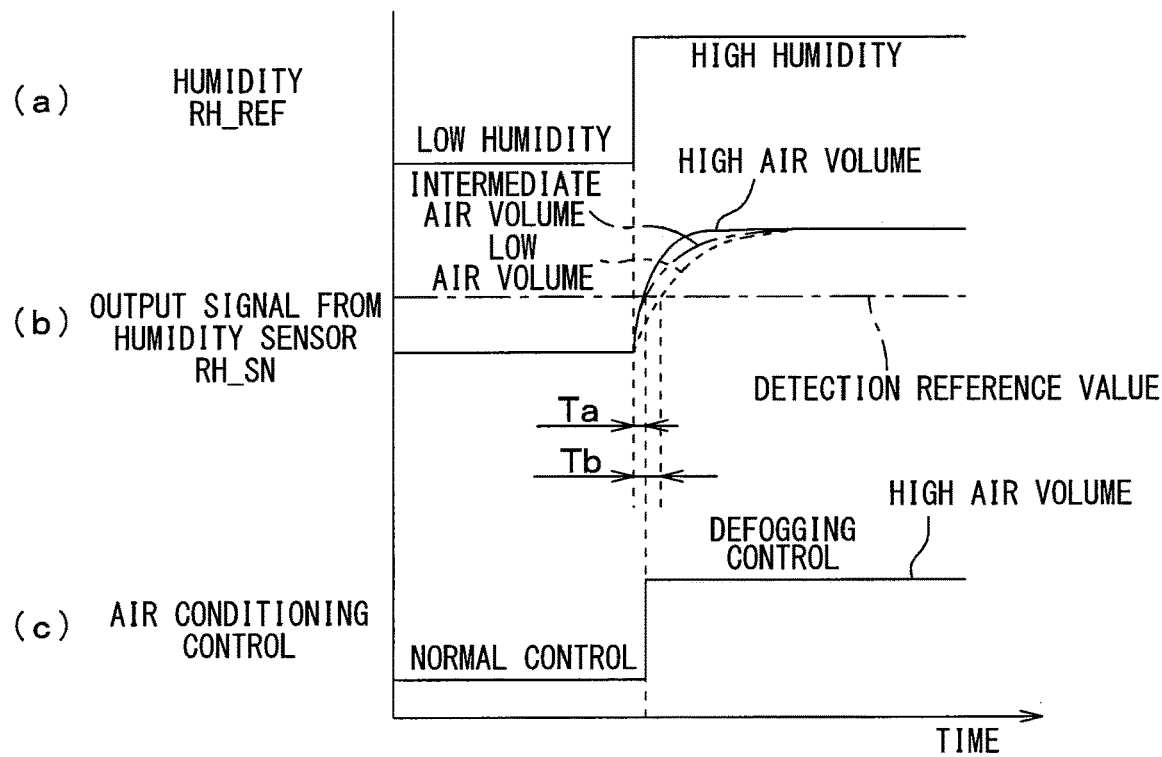
FIG. 9 is a timing chart illustrating a characteristic of a detection value of a humidity sensor in FIG. 1 after correction.

In FIG. 9, (a) illustrates change of the humidity RH_REF in the vehicle compartment, (b) illustrates change of an output signal RHout of the humidity sensor 86 of the present embodiment after the correction, and (c) illustrates air conditioning control states. When the air volume is large, there is no hunting in the output signal RHout of the humidity sensor 86 after the correction and the air conditioning control becomes stable. Response delay times Ta and Tb are shortened in the output signal RHout of the humidity sensor 86 after the correction.

Second Embodiment

Although the example in which the dynamic compensator is the function of a secondary delay system has been described in the above-described first embodiment, a second embodiment in which a dynamic compensator is a function of a tertiary delay system instead will be described.

Figure 10:
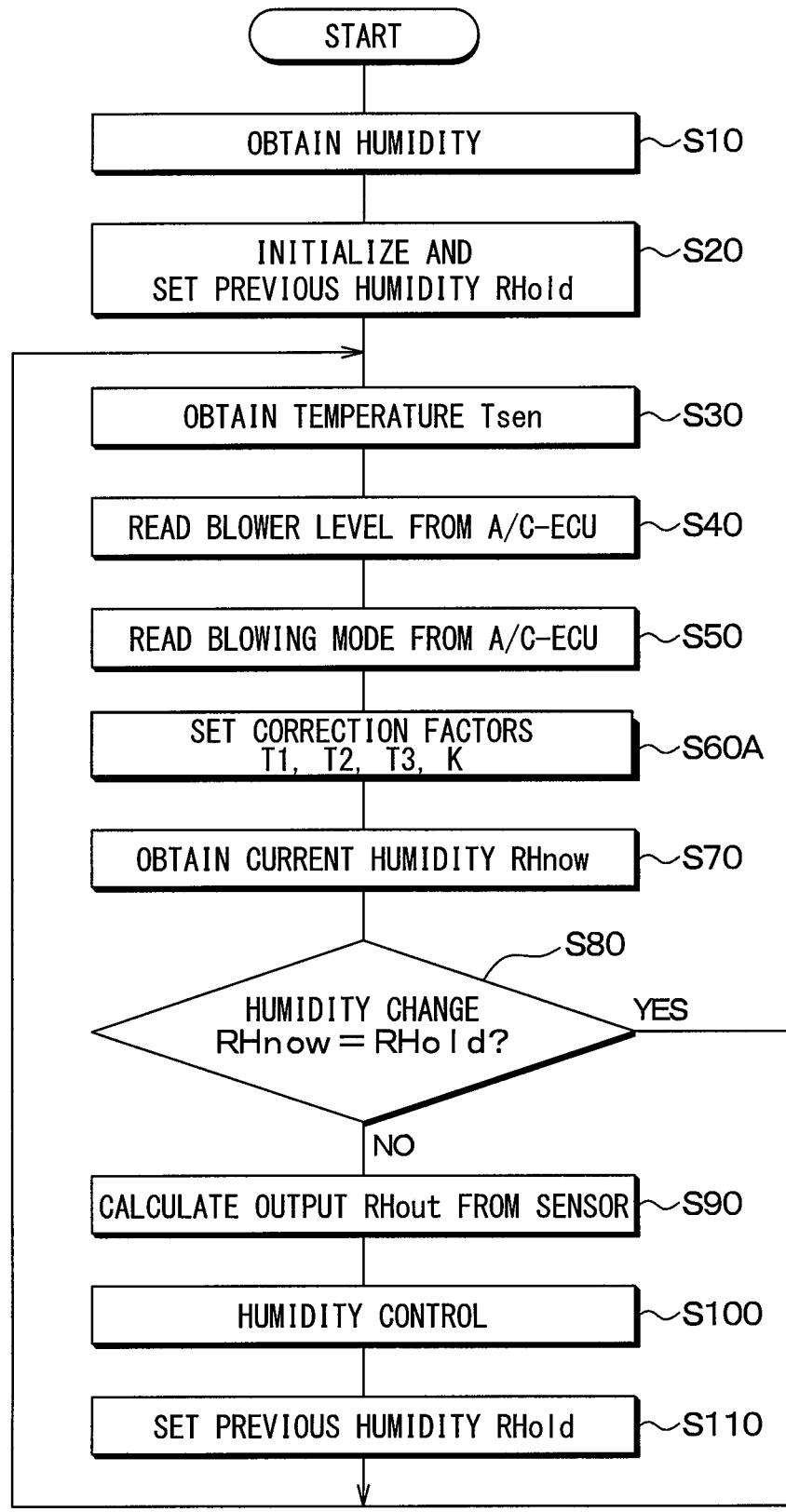
FIG. 10 is a flowchart illustrating operation processing by an operation circuit in a second embodiment.

FIG. 10 is a flowchart illustrating operation processing by a operation circuit 89 of the present embodiment.

In FIG. 10, the same reference signs as those in FIG. 5 designate the same steps and the description of the steps will be omitted. FIG. 10 includes step S60A in place of step S60 in FIG. 5.

In step S60A, the operation circuit 89 obtains RHout (m) that is an output signal of a humidity sensor 86 after correction by using a dynamic compensator expressed by following Expression 4.

$$\frac{RHout}{RHnow} = \frac{(T1 \cdot S + 1) \times (T2 \cdot S + 1) \times (T3 \cdot S + 1)}{(K1 \cdot S + 1) \times (K2 \cdot S + 1) \times (P \cdot S + 1)} \quad \text{[Expression 4]}$$

The dynamic compensator of the present embodiment is configured by a function, $[(T1 \cdot S+1) \times (T2 \cdot S+1) \times (T3 \cdot S+1)/(K1 \cdot S+1) \times (K2 \cdot S+1)]$, for compensating for a response delay of the humidity sensor 86 and a low-pass filter, $[1/(P \cdot S+1)]$, for filtering the output signal of the humidity sensor 86 that is compensated for the response delay by use of the function.

First, with reference to a characteristic table in FIG. 11 stored in advance in a memory, correction factors K1, K2, T1, and T3 corresponding to a blower level (BLE_LEV in FIG. 11) and a blowing mode (MODE in FIG. 11) obtained in step S50 are obtained.

In the characteristic table in FIG. 11, the blower level, the blowing mode, K1, K2, T1, and T3 are specified based on a one-to-one correspondence with each other. In other words, it is possible to obtain K1, K2, T1, and T3 based on the blower level and the blowing mode.

The correction factor T2 is obtained based on the temperature Tsen around the humidity sensor 86 with reference to the characteristic table in FIG. 7 similarly to the first embodiment.

The correction factors K1, K2, T1, and T3 obtained from the characteristic table in FIG. 11 and the correction factor T2 obtained from the characteristic table in FIG. 7 are set in the dynamic compensator.

Then, when the result of the determination in step S80 is NO because RHold (m) and RHnow (m) are not equal to each other after the processing in step S70, RHout (m) that is a relative humidity after the correction is obtained in step S90 by use of the dynamic compensator set as described above. Then, similarly to the above-described first embodiment, the processing in each of steps S100 and S110 is performed.

According to the above-described present embodiment, when the dynamic compensator is the function of the tertiary delay system, the correction factors K1, K2, T1, and T3 obtained based on the blower level and the blowing mode and the correction factor T2 obtained from the temperature around the humidity sensor 86 are set in the dynamic compensator. RHout (m) that is the relative humidity after the correction is obtained by the set dynamic compensator. In this way, it is possible to provide the humidity detector 10 in which the response delay of the humidity sensor 86 can be compensated for with high accuracy even if a sensor case formed to cover the sensor case 82 and having ventilation slits is added.

Third Embodiment

In the third embodiment, an example in which any of correction factors K1, T1, and T2 is/are changed according to a command from a user in the above-described first embodiment will be described.

Figure 12:
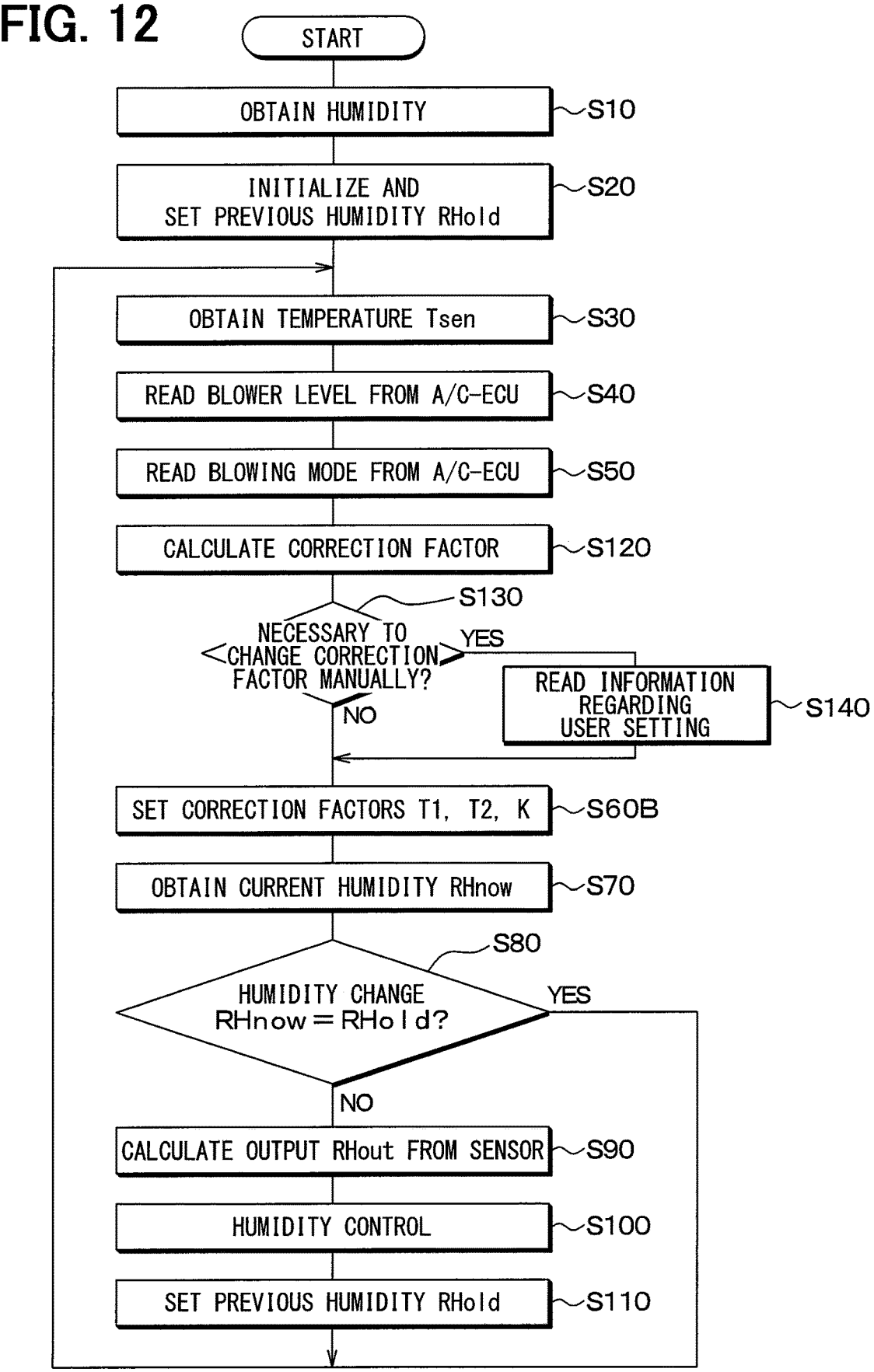
FIG. 12 is a flowchart illustrating operation processing by an operation circuit in a third embodiment.

FIG. 12 is a flowchart illustrating operation processing by a operation circuit 89 of the present embodiment.

In FIG. 12, the same reference signs as those in FIG. 5 designate the same steps and the description of the step will be omitted. FIG. 12 includes step S60B in place of step S60 in FIG. 5 and also includes additional steps S120, S130, and S140.

Steps S120, S130, and S140 are performed between step S50 and step S60B.

In step S120, the operation circuit 89 calculates the correction factors K1 and T1 corresponding to a blower level and a blowing mode with reference to a characteristic table in FIG. 6 stored in advance in a memory similarly to the first embodiment. With reference to a characteristic table in FIG. 7 stored in advance in the memory, the correction factor T2 corresponding to a temperature Tsen around the humidity sensor 86 is calculated.

The correction factors T1, T2, and K1 calculated as described above are displayed on a touch screen 110. The user is asked whether to select a selected correction factor from the correction factors T1, T2, K1 to change a value thereof. When the user selects the selected correction factor, the user is then asked to operate the touch panel 110 to select the selected correction factor.

For example, a message such as "Select any one of the displayed correction factors T1, T2, K1 to be changed and set a value for the selected correction factor" is displayed on the touch screen 110.

In step S130, the operation circuit 89 determines whether the user is requesting to change the correction factor.

When the user requests to change the correction factor, the user operates the touch screen 110 by touching the touch screen 110 to select any one of the correction factors T1, T2, K1 as the selected correction factor. Subsequently, the user inputs a correction value for the selected correction factor into the touch panel 110. A correction factor after being selected by the user and changed for the correction value will be referred to as a corrected correction factor hereafter for explanation purpose.

The operation circuit 89 estimates that the user requests to change the selected correction factor and determines the result in step S130 YES. Subsequently, the operation circuit 89 reads the corrected correction factor, which is input to the touch panel 110, from the touch panel 110 in step S140. The operation circuit 89 sets the corrected correction factor and other correction factors of the correction factors T1, T2, K1 other than the selected correction factor for the dynamic compensator.

For example, the user selects, as the selected correction factor, the correction factor T1 from the correction factors T1, T2, K1 calculated in step S120 and changes the correction factor T1 to be the corrected correction factor. In this case, the operation circuit 89 sets the corrected correction factor changed from the correction factor T1 and the other correction factors T2 and K1 for the dynamic compensator. That is, one of the correction factors T1, T2, K1 calculated in step S120 is selected and changed to be the corrected correction factor by the user, then the other factors of the correction factors T1, T2, K1 and the corrected correction factor are set for the dynamic compensator.

When the user operates the touch panel 110 to request not to change the correction factors T1, T2, K1, the operation circuit 89 performs the following operations.

The operation circuit 89 determines that the user does not request to change the correction factors and determines the result in S130 NO. In this case, the operation circuit 89 sets the correction factors T1, T2, K1 calculated in step S120 for the dynamic compensator in step S60B.

Thus, the correction factors T1, T2, K1 are set for the dynamic compensator depending on requests of the user. The flow advances from step S70 to step S80. When the operation circuit 89 determines the result in step S80 YES, i.e., RHold(m) and RHnow(m) do not coincide with each other, the operation circuit 89 calculates the relative humidity RHout(m), which is a humidity after being corrected, using the dynamic compensator that is set as described above.

Subsequently, processing of step S100 and step 110 are performed similar to the first embodiment.

According to the present embodiment, when the user selects one of the correction factors T1, T2, K1 as the selected correction factor, the operation circuit 89 obtains the corrected correction factor from the selected correction factor, and sets the corrected correction factor and the other factors of the correction factors T1, T2, K1 other than the selected correction factor for the dynamic compensator. Thus, the operation circuit 89 calculates the relative humidity RHout(m), which is a humidity after being corrected, using the above-obtained dynamic compensator. As a result, it is possible to provide the humidity detector 10 that compensates for the response delay of the humidity sensor 86 with high accuracy.

Other Embodiments (1) The above-described first embodiment is an example of using the dynamic compensator that is the secondary delay system function. The above-described second embodiment is an example of using the dynamic compensator that is the tertiary delay system function. As another example, a dynamic compensator that is N-th delay system function may be used. The N-th delay-system dynamic compensator is expressed by the following Expression 5.

[Expression 5]

$$\frac{RHout}{RHnow} = \frac{(T1 \cdot S + 1) \times (T2 \cdot S + 1) \times (T3 \cdot S + 1) \times \ldots \times (TN \cdot S + 1)}{(K1 \cdot S + 1) \times (K2 \cdot S + 1) \times \ldots \times (KN \cdot S + 1) \times (P \cdot S + 1)}$$

The N-th delay-system dynamic compensator is configured by the function, $[(T1 \cdot S+1) \times (T2 \cdot S+1) \times (T3 \cdot S+1) \times \ldots \times (TN \cdot S+1)/(K1 \cdot S+1) \times (K2 \cdot S+1) \times \ldots \times (KN \cdot S+1)]$ for compensating for a response delay of the humidity sensor 86 and a low-pass filter. The low-pass filter is $[1/(P \cdot S+1)]$. The low-pass filter filters an output signal of a humidity sensor 86 that is compensated for the response delay using the function.

In this case, N that is an order of S is an integer equal to or larger than 4. The operation circuit 89 obtains correction factors T1, T3 . . . TN, K1, K2, K3 . . . KN corresponding to a blower level (BLE_LEV in FIG. 13) and a blowing mode (MODE in FIG. 13) obtained in step S50 with reference to a characteristic table in FIG. 13 and stored in advance in a memory. The operation circuit 89 obtains a correction factor T2 based on a temperature Tsen of the humidity sensor 86 and a characteristic table in FIG. 7.

The correction factors T1, T2, T3 . . . TN, K1, K2, K3 . . . KN obtained in this manner are set in the dynamic compensator. RHout (m) that is a relative humidity after correction is obtained by use of the dynamic compensator set in this manner. In this way, it is possible to compensate for the response delay of the humidity sensor 86 with high accuracy.

FIG. 13 shows the characteristic table showing correspondence of the blower level, the blowing mode, and the correction factors T1, T3 . . . TN, K1, K2, K3 . . . KN to each other.

(2) The above-described first to third embodiments are an example of using the blower level as the air volume information that is correlated with the air volume of the air flowing around the humidity sensor 86. However, a detection value of a flow speed sensor 100 may be used, instead of the blower level, as the air volume information that is correlated with the air volume of the air flowing around the humidity sensor 86. The flow speed sensor 100 detects a flow speed of the air flowing around the humidity sensor 86.

(3) The above-described first to third embodiments are examples of using the blower level as the air volume information that is correlated with the air volume of the air flowing around the humidity sensor 86 and using the blowing mode as the flow direction information that is correlated with the flow direction of the air flowing around the humidity sensor 86. However, the following pieces of information may be employed instead.

An air volume sensor may be disposed to detect an air volume flowing outside the sensor case 82. In this case, the air volume detected by the air volume sensor is used as the air volume information that is correlated with the air volume of the air flowing around the humidity sensor 86.

According to this example, a flow direction sensor that measures a flow direction of the air flowing outside the sensor case 82 is disposed, such that a flow direction detected by the flow direction sensor is used as flow direction information correlated with the flow direction of the air flowing around the humidity sensor 86.

(4) According to the above-described third embodiment, the user operates the touch panel 110 by touching the touch panel 110 to select one of the correction factors T1, T2, K1 to be changed. However, the one of the correction factors T1, T2, K1 may be selected by voice input of the user.

(5) In the example described in each of the above first to third embodiments, the humidity detector 10 is disposed on the windshield 92. However, the present invention is not limited to the embodiments. The humidity detector 10 may be disposed at other positions than the windshield 92 in the vehicle compartment.

(6) In the example described in each of the above first to third embodiments, the input to the dynamic compensator is the output signal (i.e., detection value) of the humidity sensor 86. However, a result obtained by performing signal processing of an output signal of the humidity sensor 86 by use of various filters or the like may be used as an input to a dynamic compensator.

(7) In the example described in the above third embodiment, any one of the correction factor configuring the dynamic compensator is changed according to the requirement by the user. However, any of the correction factors forming the dynamic compensator may be changed along various control processing.

(8) In the example described in each of the above first to third embodiments, the air volume information correlated with the air volume of the air flowing around the humidity sensor 86 is the blower level. However, the present invention is not limited to the embodiments. Information other than the blower level may be used as the air volume information. For example, an air volume sensor that detects an air volume of an air flowing around the humidity detector 10 may be employed and a detection value of the air volume sensor may be used as air volume information.

Information other than the blowing mode may be used as flow direction information correlated with a flow direction of the air flowing around the humidity sensor 86. For example, a flow direction sensor that detects a flow direction of the air flowing around the humidity detector 10 may be employed, and a detection value of the flow direction sensor may be used as flow direction information.

(9) In the example described in each of the above first to third embodiments, the ventilation slits 82*a* are provided as air inlets of the sensor case 82. However, instead of the ventilation slits 82*a*, an opening may be formed as an air inlet and covered with a moisture permeable film in the sensor case 82. Here, the moisture permeable film has both of water proof property and moisture permeability. The moisture permeable film does not allow water to enter but allows water vapor to enter.

(10) The present disclosure is not limited to the above-described embodiments and can be modified within the scope of the present disclosure. The above-described embodiments are not unrelated to each other and can be combined with each other except for a case where the combination is clearly improper. In the above-described embodiments, it is to be understood that elements constituting the embodiments are not necessary except for a case of being explicitly specified to be necessary and a case of being considered to be absolutely necessary in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, or a positional relation of members, it is to be understood that such feature is not limited to a specific material, shape, positional relation, or the like except for a case of being explicitly specified to be necessary and a case of being considered to be absolutely necessary in principle.

In the above-described embodiments, step S40 configures an air volume obtaining section, step S50 configures a flow direction obtaining section, step S60 configures a setting section, step S90 configures a correction section, and step S30 configures a temperature obtaining section. Step S120 configures a calculation section and step S130 forms a determination section. Step S60B configures a setting section and the evaporator 38 and the heater core 44 correspond to heat exchangers. The defroster air outlet 48, the face air outlet 49, and the foot outlet 50 correspond to air outlets and the defroster door 51, the face door 52, and the foot door 53 correspond to doors. The air conditioner ECU 26 corresponds to an air conditioning controller and the sensor case 82, the bracket 83, and the stopper 93 configures a sensor case.

According to an aspect of the present disclosure, the dynamic compensator is a function of compensating the response delay of the humidity sensor, where S that is the complex number is the variable. The correction factors are factors by each of which S is multiplied in the dynamic compensator.

According to another aspect of the present disclosure, RHout/RHnow is expressed by following Expression 1, where the detection value of the humidity sensor is RHnow, the detection value of the humidity sensor after the correction is RHout, N is the integer equal to or larger than 2 and is the order of S, P is the constant that determines the cutoff frequency of the low-pass filter, and T1, T2, . . . TN, K1, K2 . . . KN are the correction factors.

[Expression 1]

$$\frac{RHout}{RHnow} = \frac{(T1 \cdot S + 1) \times (T2 \cdot S + 1) \times (T3 \cdot S + 1) \times \ldots \times (TN \cdot S + 1)}{(K1 \cdot S + 1) \times (K2 \cdot S + 1) \times \ldots \times (KN \cdot S + 1) \times (P \cdot S + 1)}$$

At this time, the setting section sets T2 that is the correction factor, based on the detection value of the temperature sensor in order to compensate for the response delay of the humidity sensor that changes depending on the temperature around the humidity sensor. Moreover, the setting section sets the correction factors other than T2 out of T1, T2, . . . TN, K1, K2 . . . KN that are the correction factors, based on the air volume information and the flow direction information in order to compensate for the response delay of the humidity sensor that changes depending on the air volume and the flow direction of the air flowing around the humidity sensor.

In Expression 1, when N is 2, T3 and TN are "0", and K2 and KN are "0".

What is claimed is:

1. A humidity detector having a sensor case and a humidity sensor, the sensor case being located inside a vehicle compartment and having an air inlet through which an air flows into the sensor case from the vehicle compartment, the humidity sensor being housed in the sensor case and detecting a relative humidity of the air, the humidity detector comprising:
   a processor configured to, by executing a program,
   obtain air volume information correlated with an air volume of the air flowing around the humidity sensor,
   obtain a flow direction information correlated with a flow direction of the air flowing around the humidity sensor,
   set a correction factor configuring a dynamic compensator based on the air volume information and the flow direction information, the dynamic compensator compensating for a response delay of the humidity sensor that is caused due to the sensor case and that changes due to the air volume and the flow direction, and
   correct a detection value, which is detected by the humidity sensor, by using the dynamic compensator to obtain the relative humidity of the air outside the sensor case in the vehicle compartment,
   wherein
   the dynamic compensator is a function that
     uses a complex number represented by S as a variable number,
     uses the detection value detected by the humidity sensor as an input,
     uses a corrected detection value as an output, and
     filters the detection value detected by the humidity sensor using a low-pass filter while compensating for the response delay of the humidity sensor,
   the following Expression 1 is satisfied:

[Expression 1]

$$\frac{RHout}{RHnow} = \frac{(T1 \cdot S + 1) \times (T2 \cdot S + 1) \times (T3 \cdot S + 1) \times \ldots \times (TN \cdot S + 1)}{(K1 \cdot S + 1) \times (K2 \cdot S + 1) \times \ldots \times (KN \cdot S + 1) \times (P \cdot S + 1)}$$

RHnow represents the detection value detected by the humidity sensor,
   RHout represents the corrected detection value that is determined by correcting the detection value,
   N represents a value that is an integer larger than two and is an order of S,
   P represents a constant used to set a cutoff frequency of the low-pass filter,
   T1, T2, . . . TN and K1, K2 . . . KN represents the correction factors,
   T2, which is one of the correction factors represented by T1, T2, . . . TN and K1, K2 . . . KN, is based on the detection value detected by the temperature sensor in order to compensate for the response delay of the humidity sensor that changes depending on the temperature around the humidity sensor, and
   another one of the correction factors other than T2 is based on the air volume information and the flow direction information in order to compensate for the response delay of the humidity sensor that changes depending on the air volume and the flow direction of the air flowing around the humidity sensor.

2. The humidity detector according to claim 1, wherein the processor is configured to
   obtain a detection value detected by a temperature sensor detecting a temperature around the humidity sensor, wherein
   the dynamic compensator is based on the detection value of the temperature sensor, the air volume information, and the flow direction information in order to compensate for the response delay of the humidity sensor that changes depending on the air volume, the flow direction, and the temperature around the humidity sensor.

3. The humidity detector according to claim 1, wherein the processor is configured to
   calculate the correction factors used in the dynamic compensator, and
   determine whether a request to change any one of the correction factors calculated is made, wherein
   when the processor determines that the request is made, the processor is configured to change the any one of the correction factors to be a changed correction factor based on the request and is configured to apply the correction factors including the changed correction factor to the dynamic compensator.

4. The humidity detector according to claim 1, the humidity detector being mounted to a vehicle having a vehicle air conditioner, wherein the vehicle air conditioner has
- a blower that blows air toward an inside of the vehicle compartment,
- a heat exchanger that adjusts a temperature of the air blown from the blower, the air flowing out of the heat exchanger as a conditioned air,
- a plurality of outlet defining portions that define a plurality of air outlets respectively, the plurality of air outlets blowing the conditioned air into the vehicle compartment,
- a plurality of doors that open and close the plurality of air outlets respectively, and
- an air conditioning controller that controls a volume of the air blown by the blower and performs blowing modes in which the conditioned air is blown from at least one of the plurality of air outlets by operating the plurality of doors, the processor is configured to obtain the air volume information that is output from the air conditioning controller and corresponds to the volume of the air blown from the blower, and obtain the flow direction information that is output from the air conditioning controller and corresponds to one of the blowing modes being performed presently.

5. The humidity detector according to claim 1, further comprising
- a flow speed sensor that detects a flow speed of the air flowing around the humidity sensor in the sensor case, wherein
- the processor is configured to obtain a detection value of the flow speed sensor as the air volume information.

* * * * *